United States Patent Office 3,347,263
Patented Oct. 17, 1967

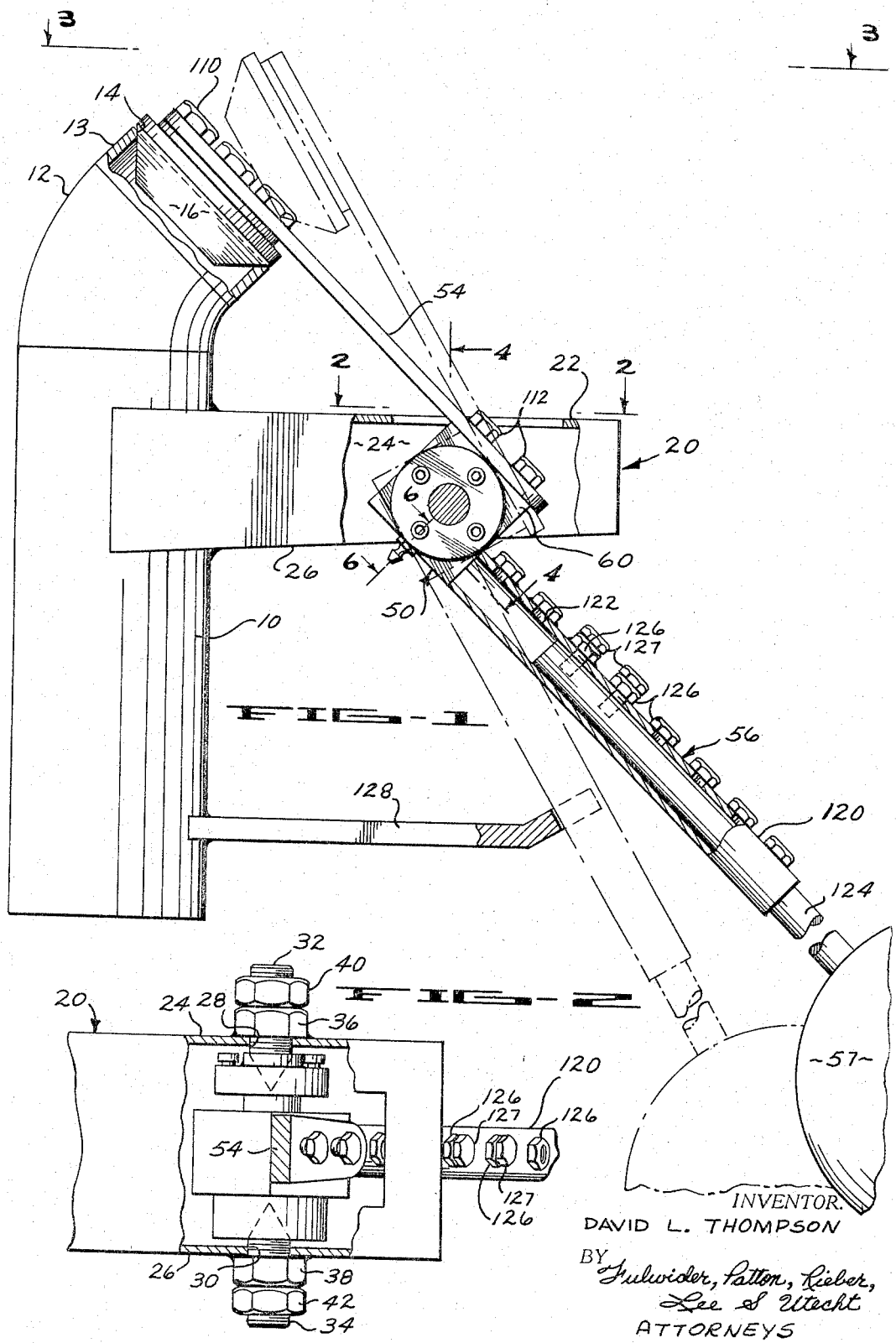

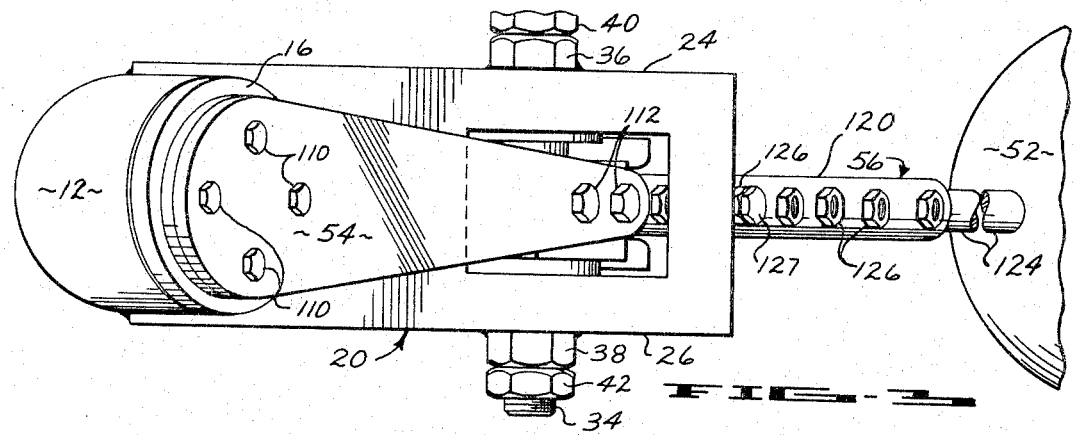
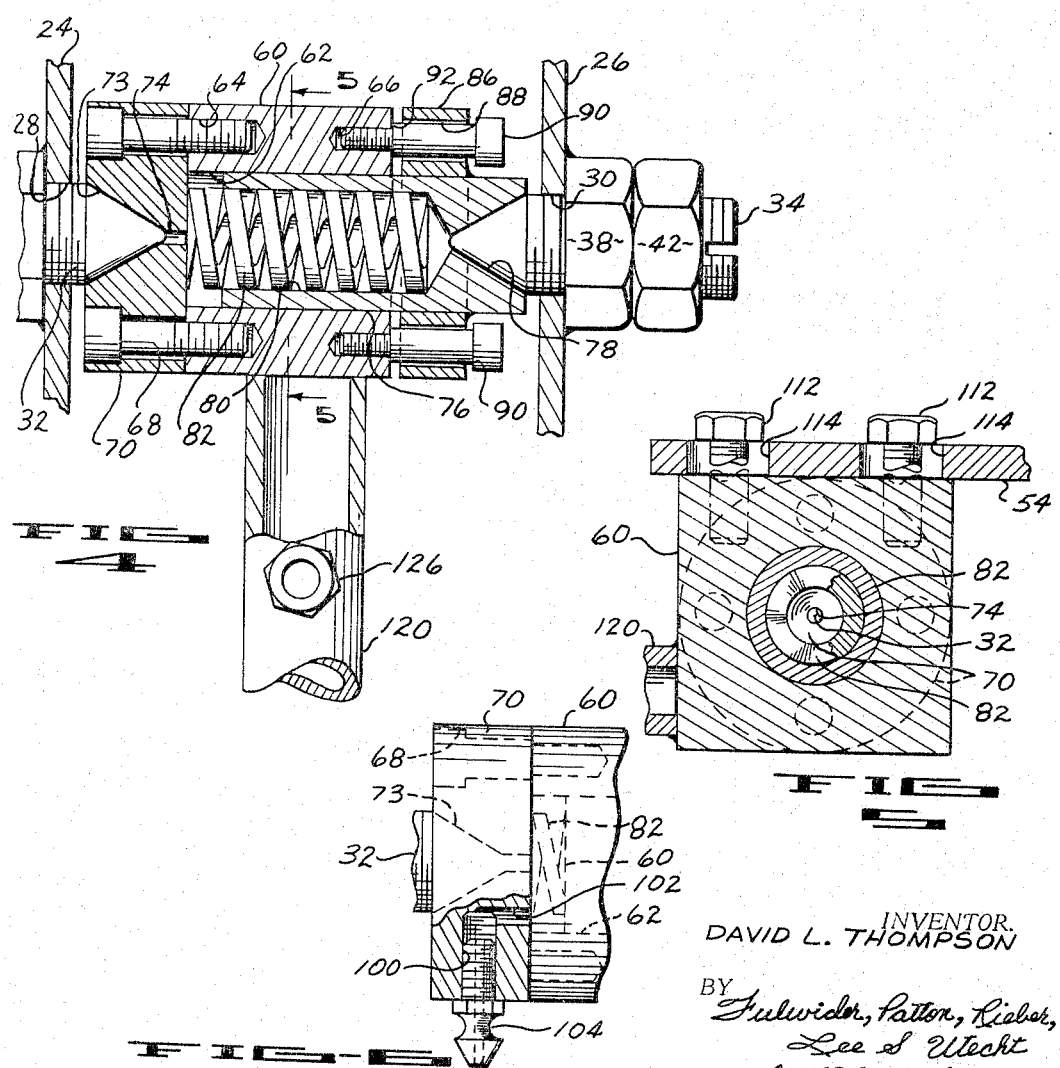

3,347,263
FLOAT VALVE ASSEMBLY FOR A PORTABLE
VACUUM TANK
David L. Thompson, Long Beach, Calif., assignor to
Thompson Tank and Manufacturing Co., Inc., Long
Beach, Calif., a corporation of California
Filed June 28, 1965, Ser. No. 467,474
7 Claims. (Cl. 137—448)

The present invention relates generally to tank trucks and is particularly directed to a tank truck adapted to load and unload thick liquids.

There have been heretofore proposed tank trucks for loading, transporting and discharging thick liquids such as heavy crude oil and the like. Apparatus of this general nature is disclosed in L. R. Wahl et al. Patent No. 2,522,077 issued Sept. 12, 1950, Patent No. 2,664,911 issued Jan. 5, 1954 to Clarence S. Thompson and George E. Clark, and my copending patent application Ser. No. 467,200 filed June 28, 1965, now patent No. 3,315,611. Such tank trucks include a power-driven pump operable to alternately furnish either a vacuum or superatmospheric air pressure to the interior of the tank. The tank is provided with an inlet fitting through which liquid is drawn into the tank when the pump provides a vacuum within the tank. The tank is also provided with a discharge fitting through which liquid is exhausted from the tank when the pump supplies superatmospheric air pressure to the interior of the tank. The tank is formed with a dome, with the interior of such dome being connected to the pump by pipe means. A float valve is provided for controlling flow through the upper end of such pipe means. It has been found that the float valve pivot undergoes considerable and rapid wear as the truck moves during transportation of the liquid carried by the truck, such wear taking place when the upper layer of the liquid being transported engages the float of the float valve and transmits heavy forces to the float valve pivot.

It is a major object of the present invention to provide a novel and improved float valve construction for use with a vacuum truck.

Another object of the present invention is to provide a float valve construction wherein the pivot of such valve is extremely resistant to wear.

It is another object of the present invention to provide a float valve construction of the aforedescribed nature wherein the float thereof may be readily adjusted to accommodate liquid loads of varying heights.

A further object of the present invention is to provide a float valve construction of the aforedescribed nature which is simple of design and economical of production.

Other objects and advantages of the present invention will become apparent from the following detailed description of a preferred embodiment thereof, when taken in conjunction with the appended drawings wherein:

FIGURE 1 is a broken side elevational view taken partly in central vertical section showing a float valve construction embodying the present invention;

FIGURE 2 is a broken horizontal sectional view taken on line 2—2 of FIGURE 1;

FIGURE 3 is a top plan view of said float valve construction taken along line 3—3 of FIGURE 1;

FIGURE 4 is a fragmentary vertical sectional view taken in enlarged scale on line 4—4 of FIGURE 1;

FIGURE 5 is a sectional view taken on line 5—5 of FIGURE 4; and

FIGURE 6 is a sectional view taken in enlarged scale along line 6—6 of FIGURE 1.

Referring to the drawings, the float valve construction embodying the present invention is adapted for use within the tank of a tank truck, such as that disclosed in the aforementioned Patent Nos. 2,522,077 and 2,664,911 and my copending patent application Ser. No. 467,200 filed June 28, 1965, now patent No. 3,315,611. The tank truck is provided wtih a dome within which is disposed an upstanding pipe 10. The lower portion of the pipe 10 is in communication with a power-driven pump (not shown). The upper end of the pipe is formed with an elbow 12 that is provided at its upper end with a valve seat element 13. The upper portion of valve seat element 13 is beveled radially inwardly so as to define a valve seat 14.

A generally frusto-conical valve closure element 16 seats upon the valve seat 14 so as to block flow through pipe 10. The closure element 16 may be formed of a suitable material, as for example neoprene, and is movable to its dotted outline position of FIGURE 1 so as to permit fluid flow through pipe 10. It should be understood that with the valve closure element 16 seated on valve seat 14 communication between the power-driven pump and the interior of the tank is blocked. When, however, the valve closure element 16 is raised to its open position, fluid flow may take place between the interior of the tank and the power-driven pump. Hence, with the valve closure element 16 disposed in its raised position, the application of superatmospheric air pressure to the tank interior from the pump will cause liquid disposed within the tank to be forced out of the tank. Conversely, the imposition of a vacuum upon the interior of the tank by means of the pump will permit liquid to be drawn into the tank.

The pipe 10 is provided near its upper end with a rigid, horizontally extending support, generally designated 20. The inner portion of the support 20 is rigidly affixed to the pipe 10 as by welding. The support 20 includes a horizontal upper wall 22 and a pair of side walls 24 and 26 that integrally depend from upper wall 22. The side walls 24 and 26 are provied with a pair of transversely aligned bores 28 and 30. A pair of horizontal cone set screws 32 and 34 are received within the bores 28 and 30, respectively. The cone set screws 32 and 34 are supported with their pointed ends arranged within the confines of the support 20 by means of nuts 36 and 38, respectively. These nuts 36 and 38 are welded to the exterior surfaces of the side walls 24 and 26. Lock nuts 40 and 42 are threaded upon the cone set screws 32 and 34, respectively, outwardly of the support nuts 36 and 38.

The float valve includes in addition to the aforementioned closure element 16, a pivot assembly, generally designated 50, that is pivotally carried by the aforementioned cone set screws 32 and 34, a conventional ball float 52, a rigid upper arm 54 interconnecting the closure element 16 and the pivot assembly 50 and a lower arm assembly, generally designated 56, connecting the pivot assembly 50 and the ball float 52.

The pivot assembly 50 includes a support block 60 of generally rectangular configuration formed with a horizontal central bore 62. Both sides of the support block 60 are formed with a plurality of inwardly extending threaded blind bores 64 and 66. The blind bores 64 receive cap screws 68 so as to secure a cylindrical cap 70 to the left-hand side of the support block 60 relative to FIGURE 4. The cap 70 is formed with an inwardly tapering central conical pocket 73 that receives the coned end of cone set screw 32. A grease passage 74 connects the center of the coned pocket 73 with the interior of the bore 62 of support block 60.

The bore 62 of support block 60 slidably receives a horizontal sleeve 76. The outer portion of the sleeve 76 is formed with a coned pocket 78 that receives the coned portion of the cone set screw 34. The portion of the sleeve 76 inwardly of the pocket 78 is formed with a spring bore 80, with the center portions of the pocket 78 and the spring cavity 80 being in communication. A coil compression spring 82 is disposed within the spring cavity 80, with the left-hand side of such spring as viewed in FIGURE 4 abutting the inner surface of the cap 70 whereby spring 82 constantly urges cap 70 and spring sleeve 76 apart. The outer portion of the spring sleeve 76 is rigidly affixed as by welding to a retainer 86. The retainer is formed with a plurality of horizontally extending smooth bores 88 aligned with the aforedescribed threaded blind bores 66 formed in the support block 60. The bores 88 and 66 receive cap screws 90. It should be noted that the outer portion of the shank of each of these cap screws 90 is of greater diameter than the inner portion thereof whereby shoulder 92 is defined on the shank. The shoulder 92 of each cap screw 90 abuts the adjoining outer surface of the support block 60. The diameter of the bores 88 is greater than the diameter of the shanks of cap screws 90 whereby retainer 86 and hence sleeve 76 are movable as a unit relative to support block 60 and cap 70.

As indicated particularly in FIGURES 1 and 6, the cap 70 is formed with a threaded bore 100 which is in communication with the bore 62 of support block 60 by means of a passage 102. A conventional grease fitting 104 is disposed within the bore 100. With this arrangement, grease under pressure may be forced into the bore 62 so as to fill all of the space encompassed thereby, with such grease reaching the coned pockets 73 and 78 so as to effect efficient lubrication between the abutting bearing surfaces of these pockets and the coned portion of the set screws 32 and 34.

Referring now particularly to FIGURES 1 and 3, the upper end of the upper arm 54 is secured to the valve closure element 16 by a plurality of cap screws 110. The opposite end of this arm 54 is secured to the support block 60 by a pair of cap screws 112. Preferably, as indicated in FIGURE 5, the cap screws 112 extend through longitudinally elongated slots 114 formed in arm 54 so as to permit adjustment of the effective length of this arm 54. This arrangement facilitates centering the valve closure element 16 relative to the valve seat 14.

The lower arm assembly 56 includes a tube 120 having its upper portion rigidly affixed to support block 60 as by welding. The tube 120 is formed with a plurality of longitudinally spaced bores 122. Telescopically slidably disposed within the tube 120 is a rod 124. The lower end of this rod is rigidly affixed to the ball float 52. The upper portion of the rod 124 is secured within tube 120 by means of cap screws 126 that extend through lock nuts 127 into a desired pair of the bores 122. A rigid horizontally extending stop 128 is provided for the lower arm 56 so as to limit its downward pivotal movement. The stop 128 is rigidly affixed as by welding to the lower portion of the pipe 10, as shown in FIGURE 1.

In the operation of the aforedescribed apparatus, the effective length of the lower arm 56 will be adjusted in accordance with the level to which the liquid is expected to rise within the tank. The adjustment is made by removing the cap screws 126 from tube 120 whereafter rod 124 is urged either upwardly or downwardly as necessary so as to properly adjust the ball float 52. The cap screws 126 are then inserted through the appropriate pair of bores 122 and tightened. If necessary, the effective length of the upper arm 54 may also be adjusted so as to properly center the valve closure element 16 relative to valve seat 13. This is accomplished by first loosening the cap screws 112 whereby the arm 54 may be moved within the limits defined by the slots 114. Thereafter, the cap screws 112 are again tightened.

Prior to use of the float valve, grease under pressure will be forced through grease fitting 104. As indicated hereinbefore, this grease will effectively lubricate the bearing surfaces between the coned portions of the coned set screws 32 and 34 and the pockets 73 and 78. The resiliency provided by the spring 82 dampens shocks transmitted from the lower arm 56 to the bearing assembly as the surface of the liquid being transported sloshes about and engages the ball float 52. In this manner, any wear between the cone set screws 32 and 34 and the bearing surfaces of the pockets 73 and 78 will be reduced to a minimum.

It should be particularly noted that the aforedescribed arrangement provides for self adjustment of the pivot assembly parts which undergo wear. Thus, as wear takes place between the pocket 72 and set screw 32 and between pocket 78 and set screw 34, the spring 82 will automatically maintain the wearing surfaces in tight engagement. Accordingly, no sloppiness will ever exist between such wearing parts. If a sloppy fit were permitted, these surfaces would undergo very rapid wear. At such time as it becomes necessary, set screw 34 may be tightened to compensate for the gradual wear that takes place between the set screws 32 and 34 and their respective pockets 72 and 78.

Various modifications and changes may be made with respect to the foregoing detailed description without departing from the spirit of the present invention or the scope of the following claims.

I claim:

1. A float valve assembly for a portable vacuum tank, comprising:
   an upstanding pipe that is mounted in said tank, the upper end of said pipe being formed with a valve seat;
   a support extending from said pipe, said support having a pair of vertical side walls;
   a pair of horizontally aligned cone set screws carried by said side walls;
   a pivot assembly pivotally carried by said set screws that includes a support block formed with a coned pocket that receives one of said set screws and with a horizontal bore coaxial with said coned pocket, said bore opening towards the other of said set screws, said pivot assembly also including a sleeve horizontally slidably disposed within said bore, the end of said sleeve remote from said first-mentioned coned pocket being formed with a second coned pocket that receives said other set screw, and said pivot assembly further including a compression spring interposed between said support block and said sleeve to constantly urge them apart;
   an upper arm having its lower portion secured to said pivot assembly;
   a closure element secured to the upper end of said upper arm that is sealingly engageable with said valve seat;
   a lower arm having its upper end secured to said pivot assembly; and
   a float secured to the lower end of said lower arm.

2. A float valve assembly as set forth in claim 1 wherein said pivot assembly is provided with means for forcing a lubricant into the bore of said support block.

3. A float valve assembly as set forth in claim 1 wherein said sleeve is formed with a coaxial spring cavity that opens towards said first-mentioned set screw and said spring means is a coil compression spring disposed within said spring cavity.

4. A float valve assembly as set forth in claim 1 wherein said second-mentioned set screw is adjustable relative to said support towards and away from said pivot assembly.

5. A float valve assembly for a portable vacuum tank, comprising:
   an upstanding pipe that is mounted in said tank, the upper end of said pipe being formed with a valve seat;
   a support extending from said pipe, said support having a pair of vertical side walls;
   a pair of horizontally aligned cone set screws carried by said side walls;

a pivot assembly pivotally carried by said set screws that includes a support block formed with a coned pocket that receives one of said set screws and with a horizontal bore coaxial with said coned pocket, said bore opening towards the other of said set screws, said pivot assembly also including a sleeve horizontally slidably disposed within said bore, the end of said sleeve remote from said first-mentioned coned pocket being formed with a second coned pocket that receives said other set screw, and said pivot assembly further including a compression spring interposed between said support block and said sleeve to constantly urge them apart;

an upper arm having its lower portion secured to said pivot assembly;

a closure element secured to the upper end of said upper arm that is sealingly engageable with said valve seat;

a float; and a lower arm assembly having its upper end secured to said pivot assembly and its lower end secured to said float, said lower arm assembly being adjustable in length to conform to the level to which liquid is expected to rise within said tank.

6. A float valve assembly for a portable vacuum tank, comprising:

an upstanding pipe that is mounted in said tank, the upper end of said pipe being formed with a valve seat;

a support extending from said pipe, said support having a pair of vertical side walls;

a pair of horizontally aligned cone set screws carried by said side walls;

a pivot assembly pivotally carried by said set screws that includes a support block formed with a coned pocket that receives one of said set screws and with a horizontal bore coaxial with said coned pocket, said bore opening towards the other of said set screws, said pivot assembly also including a sleeve horizontally slidably disposed within said bore, the end of said sleeve remote from said first-mentioned coned pocket being formed with a second coned pocket that receives said other set screw, and said pivot assembly further including a compression spring interposed between said support block and said sleeve to constantly urge them apart;

a closure element engageable with said valve seat;

an upper arm assembly having its upper end secured to said closure element and its lower end secured to said pivot assembly, the effective length of said upper arm assembly being adjustable to properly center said closure element relative to said valve seat;

a lower arm having its upper end secured to said pivot assembly; and a float secured to the lower end of said lower arm.

7. A float valve assembly for a portable vacuum tank, comprising:

an upstanding pipe that is mounted in said tank, the upper end of said pipe being formed with a valve seat;

a support extending from said pipe, said support having a pair of vertical side walls;

a pair of horizontally aligned cone set screws carried by said side walls;

a pivot assembly pivotally carried by said set screws that includes a support block formed with a coned pocket that receives one of said set screws and with a horizontal bore coaxial with said coned pocket, said bore opening towards the other of said set screws, said pivot assembly also including a sleeve horizontally slidably disposed within said bore, the end of said sleeve remote from said first-mentioned coned pocket being formed with a second coned pocket that receives said other set screw, and said pivot assembly further including a compression spring interposed between said support block and said sleeve to constantly urge them apart;

a closure element engageable with said valve seat;

an upper arm assembly having its upper end secured to said closure element and its lower end secured to said pivot assembly, the effective length of said upper arm assembly being adjustable to properly center said closure element relative to said valve seat;

a float; and a lower arm assembly having its upper end secured to said pivot assembly and its lower end secured to said float, said lower arm assembly being adjustable in length to conform to the level to which liquid is expected to rise within said tank.

References Cited
UNITED STATES PATENTS 1,712,310  5/1929  Sayre.
2,814,306  11/1957  Ponsar _____ 137—434 X WILLIAM F. O'DEA, *Primary Examiner.*

D. R. MATTHEWS, *Assistant Examiner.*